UNITED STATES PATENT OFFICE.

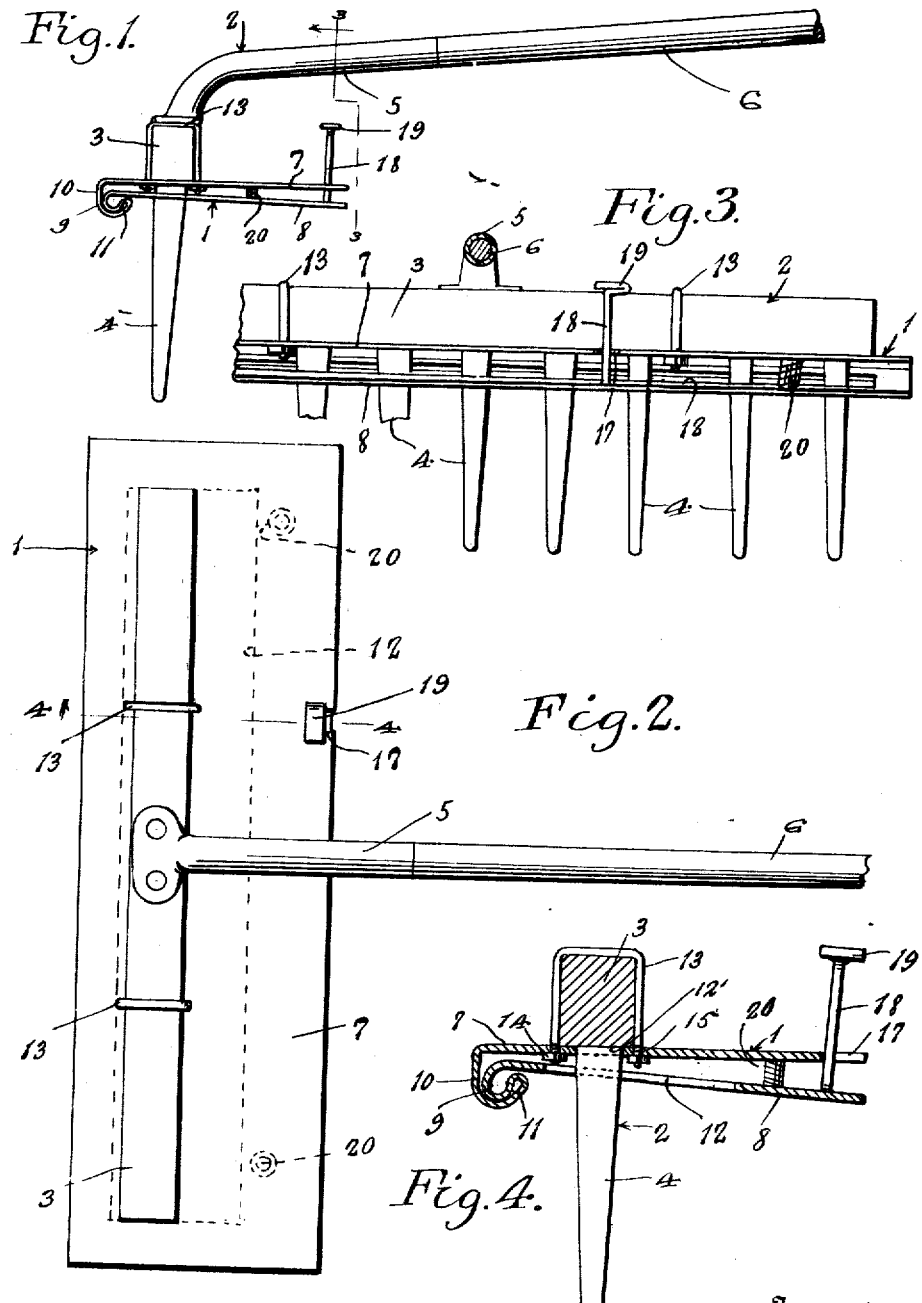

SALLIE S. GILKEY, OF MARION, NORTH CAROLINA.

RAKE ATTACHMENT.

1,308,706.   Specification of Letters Patent.   Patented July 1, 1919.

Application filed November 9, 1918. Serial No. 261,842.

*To all whom it may concern:*

Be it known that I, SALLIE S. GILKEY, a citizen of the United States, residing at Marion, in the county of McDowell and State of North Carolina, have invented certain new and useful Improvements in Rake Attachments; and I do hereby declare the following to be a full, clear, and exact description of the invention, such as will enable others skilled in the art to which it appertains to make and use the same.

This invention relates to rakes and the primary object of the invention is to provide an improved attachment for cleaning the teeth thereof.

Another object of the invention is to provide an improved attachment for rakes, which can be readily attached to the ordinary types of rakes for effectively cleaning the teeth thereof.

A further object of the invention is to provide a cleaning attachment for rakes, formed from a single sheet of resilient metal bent back upon itself to provide an attaching bar and a tooth cleaning bar and means carried by the tooth cleaning bar for depressing the same to force the debris from between the rake teeth.

With these and other objects in view, the invention consists in the novel construction, arrangement and formation of parts, as will be hereinafter more specifically described, claimed and illustrated in the accompanying drawing, forming a part thereof in which, Figure 1 is a side elevation of a rake provided with the improved cleaning attachment, Fig. 2 is a plan view of the same, Fig. 3 is a transverse cross section taken on the line 3—3 of Fig. 1, and Fig. 4 is a cross section taken on the line 4—4 of Fig. 2.

Referring to the drawing in detail, wherein similar reference characters designate corresponding parts throughout the several views, the numeral 1 generally indicates an improved rake cleaning attachment, which is adapted to be secured to a rake 2 of the ordinary or any preferred type. The rake 2 includes the rake head 3 having downwardly extending teeth 4. The shank 5 of the rake is secured in any preferred manner in the handle 6.

The rake cleaning attachment 1 is formed from a single sheet of resilient spring metal and is bent along a central longitudinal line back upon itself to provide an upper attaching bar 7 and a lower cleaning bar 8. A spring hinge 9 is formed at the point of bending of the cleaning device 1, by bending the metal downward at right angles to the bars 7 and 8 as at 10 and then rolling the same as at 11. This formation allows the lower plate or bar 8 to be readily depressed when so desired.

The upper bar 7 is provided with teeth receiving openings 12' and the lower bar 8 is provided with longitudinally extending slots 12, which are in direct alinement with the teeth receiving openings, and are adapted to receive the teeth. The upper bar 7 is secured to the rake head 3 by means of U-shaped bolts 13, which have the terminals thereof screw threaded and extended through apertures 14 formed in the upper plate adjacent to the end thereof. Suitable nuts 16 are threaded on the terminals of the bolts so as to hold the plate 7 in rigid position on the rake head. The rear edge of the upper attaching bar 7 is provided with an inwardly extending slot or notch 17, through which extends the standard 18 which is secured to the cleaning bar 8. A suitable foot pedal 19 is formed on the free edge of the standard and forms means whereby the lever can be readily engaged to depress the plate 8.

Contractile coil springs 20 are positioned between the bars 7 and 8 and have the terminals thereof secured thereto. These contractile coil springs 20 normally tend to hold the bars 7 and 8 into close engagement with each other. Owing to the formation of the spring hinge 9 and the inherent resiliency of the plate, the bar 8 normally tends to stay in a raised position, for the springs 20 form a positive means for returning the bar to its raised position.

In operation of the improved device, when it is desired to clean the teeth 4 from any material which has been lodged between the teeth, the lower plate or bar 8 is depressed by means of placing the foot on the pedal 19, which swings the same downward and forces the walls of the slots 12 into engagement with the teeth and thus effectively forces and dislodges the material from the teeth.

In practice, I have found that the form of my invention, illustrated in the accompanying drawing and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required without sacrificing any of the advantages of my invention as set forth.

What I claim as new is:—

1. A device of the class described, the combination, a rake including a head and downwardly extending prongs, of a cleaning attachment comprising a resilient plate bent back upon itself, said plate having longitudinally extending slots for receiving the prongs, means for securing the upper portion of the plate to the rake head, and means for depressing the lower portion.

2. In a device of the class described, the combination with a rake including a head and downwardly extending prongs, of a cleaning attachment including a spring plate bent back upon itself to form an upper attaching bar and a lower cleaning bar, means for securing the attaching bar to the rake head, spring means for normally holding the bars into engagement with each other, and means for depressing the lower bar against the tension of said spring means.

3. In a device of the class described, the combination with a rake including a head and downwardly extending prongs, of a cleaning attachment including a resilient plate bent back upon itself, the plate at the point of bending being coiled to provide a spring hinge, means for attaching the upper portion of the plate to the rake head, said upper portion having rake teeth receiving openings formed therein and the lower portions having longitudinally extending rake teeth receiving slots, an upwardly extending standard formed on the lower plate to depress the same.

In testimony whereof I affix my signature in presence of two witnesses.

SALLIE S. GILKEY.

Witnesses:
 GEO. I. WHITE,
 EURENE GILKEY.

Copies of this patent may be obtained for five cents each, by addressing the "Commissioner of Patents, Washington, D. C."